United States Patent
Mestha et al.

(10) Patent No.: US 6,744,531 B1
(45) Date of Patent: Jun. 1, 2004

(54) COLOR ADJUSTMENT APPARATUS AND METHOD

(75) Inventors: Lingappa K. Mestha, Fairport, NY (US); Eric Jackson, Rochester, NY (US); Yao Rong Wang, Webster, NY (US); Martin E. Banton, Fairport, NY (US); Peter A. Crean, Penfield, NY (US); Steven J. Harrington, Webster, NY (US); Edward J. Solcz, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/221,996

(22) Filed: Dec. 29, 1998

(51) Int. Cl.[7] ............................................. G06F 15/00
(52) U.S. Cl. ........................ 358/1.9; 358/406; 358/504
(58) Field of Search ........................ 358/1.9, 523, 518, 358/525, 520, 504, 406; 382/167, 162, 274, 225; 345/429

(56) References Cited

U.S. PATENT DOCUMENTS

| | | | | |
|---|---|---|---|---|
| 3,870,968 A | * | 3/1975 | Vosteen et al. | 330/207 |
| 4,205,257 A | * | 5/1980 | Oguro et al. | 315/39.69 |
| 4,403,866 A | * | 9/1983 | Falcoff et al. | 366/132 |

(List continued on next page.)

FOREIGN PATENT DOCUMENTS

| | | | | |
|---|---|---|---|---|
| EP | 0491131 A2 | 6/1992 | | |
| EP | 0582997 A1 | 2/1994 | | |
| EP | 0625847 A1 | 11/1994 | | |
| EP | 0811829 A2 | 12/1997 | | |
| EP | 0868074 A1 | 9/1998 | | |
| EP | 0915615 A2 | 5/1999 | | |
| JP | A-4-314768 | * | 11/1992 | C09D/7/14 |
| WO | WO 97/34409 A2 | 9/1997 | | |

OTHER PUBLICATIONS

"Color Technology for Image Devices", Henry Kang, pp. 318–327.*
"Miniature Lights for Minatures Spectrometers", Ocean Optics, Inc.,.*
"Sequential Linear Interpolation of Multidimensional Functions", James Z. Chang et al., IEEE Transactions on Image Processing, vol. 6, No. 9, Sep. 1997.*

(List continued on next page.)

*Primary Examiner*—Mark Wallerson
(74) *Attorney, Agent, or Firm*—Oliff & Berridge, PLC

(57) ABSTRACT

An apparatus and method that provide consistent output across a plurality of different hard copy output devices which may be included in a system comprising an image data source and a hard copy output device. The image data source supplies image data to a printable image data adjusting apparatus. The image data supplied may be in a device-dependent color space or a device-independent color space. If the image data is in a device-dependent color space, the printable image data adjusting apparatus first converts the image data into device-independent image data and stores it in memory as target image data. If the image data is already device-independent image data, the image data are simply stored in the memory of the printable image data adjusting apparatus as target image data. The printable image data adjusting apparatus then uses the target image data to generate printable image data. The hard copy output device uses the printable image data to generate a hard copy image. The hard copy image is then passed within the optical field of a sensor that detects device-independent image data values of the hard copy image. The detected device-independent image data values are then compared against the target image data to generate color adjustment factors. The color adjustment factors are then used to produce a hard copy image having detected device-independent image data values that more closely represent the target image data. The apparatus and method may be implemented in real-time with or without human intervention.

31 Claims, 8 Drawing Sheets

U.S. PATENT DOCUMENTS

| | | | | |
|---|---|---|---|---|
| 4,724,461 A | * | 2/1988 | Rushing | 355/14 |
| 4,853,639 A | * | 8/1989 | Vosteen et al. | 324/457 |
| 4,887,217 A | * | 12/1989 | Sherman et al. | 364/468 |
| 4,959,669 A | | 9/1990 | Haneda et al. | |
| 4,970,584 A | * | 11/1990 | Sato et al. | 358/75 |
| 5,003,327 A | * | 3/1991 | Theodoulou et al. | 346/154 |
| 5,045,882 A | * | 9/1991 | Roehrs et al. | 355/208 |
| 5,200,816 A | | 4/1993 | Rose | 358/518 |
| 5,243,383 A | * | 9/1993 | Parisi | 355/208 |
| 5,243,414 A | * | 9/1993 | Dalrymple et al. | 358/500 |
| 5,283,671 A | * | 2/1994 | Stewart et al. | 358/523 |
| 5,339,176 A | * | 8/1994 | Smilansky et al. | 358/504 |
| 5,357,448 A | | 10/1994 | Stanford | |
| 5,384,601 A | * | 1/1995 | Yamashita et al. | 348/577 |
| 5,481,380 A | * | 1/1996 | Bestmann | 358/504 |
| 5,544,258 A | * | 8/1996 | Levien | 382/169 |
| 5,559,173 A | * | 9/1996 | Campo et al. | 523/303 |
| 5,590,040 A | | 12/1996 | Abe et al. | |
| 5,604,567 A | * | 2/1997 | Dundas et al. | 399/39 |
| 5,612,902 A | | 3/1997 | Stokes | |
| 5,631,749 A | * | 5/1997 | Ueda | 358/520 |
| 5,662,044 A | * | 9/1997 | Loffler et al. | 101/492 |
| 5,664,072 A | * | 9/1997 | Ueda et al. | 395/109 |
| 5,699,489 A | * | 12/1997 | Yokomizo | 395/109 |
| 5,708,916 A | * | 1/1998 | Mestha | 399/40 |
| 5,717,978 A | * | 2/1998 | Mestha | 399/46 |
| 5,734,407 A | * | 3/1998 | Yamada et al. | 347/133 |
| 5,748,221 A | * | 5/1998 | Castelli et al. | 347/232 |
| 5,749,019 A | * | 5/1998 | Mestha | 399/46 |
| 5,749,021 A | * | 5/1998 | Mestha et al. | 399/49 |
| 5,754,918 A | * | 5/1998 | Mestha et al. | 399/48 |
| 5,767,992 A | * | 6/1998 | Tanaka et al. | 358/520 |
| 5,771,311 A | | 6/1998 | Arai | |
| 5,809,213 A | | 9/1998 | Bhattacharjya | |
| 5,812,903 A | * | 9/1998 | Yamada et al. | 399/42 |
| 5,818,960 A | * | 10/1998 | Gregory, Jr. et al. | 382/167 |
| 5,822,079 A | * | 10/1998 | Okuno et al. | 358/300 |
| 5,844,542 A | * | 12/1998 | Inoue et al. | 345/594 |
| 5,884,118 A | * | 3/1999 | Mestha et al. | 399/15 |
| 5,923,446 A | * | 7/1999 | Nakagiri | 358/1.9 |
| 5,991,511 A | * | 11/1999 | Granger | 395/109 |
| 6,005,968 A | * | 12/1999 | Granger | 382/162 |
| 6,005,970 A | | 12/1999 | Ohneda et al. | |
| 6,031,628 A | * | 2/2000 | Jacob et al. | 358/1.9 |
| 6,044,173 A | * | 3/2000 | Kumada | 382/167 |
| 6,052,195 A | | 4/2000 | Mestha et al. | |
| 6,081,353 A | * | 6/2000 | Tanaka et al. | 358/523 |
| 6,118,455 A | * | 9/2000 | Hidaka et al. | 345/589 |
| 6,157,469 A | * | 12/2000 | Mestha | 358/504 |
| 6,172,681 B1 | * | 1/2001 | Ueda | 345/589 |
| 6,185,385 B1 | | 2/2001 | Mestha et al. | |
| 6,188,786 B1 | * | 2/2001 | Ueda et al. | 382/165 |
| 6,215,561 B1 | | 4/2001 | Kakutani | |
| 6,225,974 B1 | * | 5/2001 | Marsden et al. | 345/590 |
| 6,236,474 B1 | | 5/2001 | Mestha et al. | |
| 6,262,817 B1 | * | 7/2001 | Sato et al. | 358/518 |
| 6,282,312 B1 | * | 8/2001 | McCarthy et al. | 382/162 |
| 6,292,195 B1 | | 9/2001 | Shimizu et al. | |
| 6,307,961 B1 | * | 10/2001 | Balonon-Rosen et al. | 382/167 |
| 6,323,969 B1 | | 11/2001 | Shimizu et al. | |
| 6,335,983 B1 | * | 1/2002 | McCarthy et al. | 382/162 |
| 6,344,902 B1 | | 2/2002 | Duke et al. | |

OTHER PUBLICATIONS

U.S. patent application Ser. No. 09/487,587, filed Jan. 19, 2000, Wang et al.

U.S. patent application Ser. No. 10/248,387, filed Jan. 15, 2003, Mestha et al.

U.S. patent application Ser. No. 09/487,586, Mestha et al.

U.S. patent application Ser. No. 09/461,042, filed Dec. 15, 1999, Mestha et al.

U.S. patent application Ser. No. 09/566,291.

Bens, R.S.: *"Spectral modeling of a Dye Diffusion Thermal Transfer Printer", Journal of Electronic Imaging,* vol. 2, No. 4, Oct. 1993, pp. 359–370.

"Color Technology for Image Devices", Henry Kang, pp. 318–327.

"Miniature Lights for Minature Spectrometers", Ocean Optics, Inc.,.

"Sequential Linear Interpolation of Multidimensional Functions", James Z. Chang et al., IEEE Transactions on Image Processing, vol. 6, No. 9, Sep. 1997.

* cited by examiner

COLOR ADJUSTMENT APPARATUS AND METHOD

INCORPORATION BY REFERENCE

This invention contains similar subject matter to U.S. patent application Ser. No. 09/083,203 entitled "Dynamic Device Independent Image Correction Method and Apparatus," filed on May 22, 1998, which is hereby incorporated by reference.

BACKGROUND OF THE INVENTION

1. Field of Invention

This invention is directed to apparatus and methods for providing consistent output color across a plurality of different hard copy output devices.

2. Description of Related Art

When a user creates a document or image having, for example, a plurality of colors, the colors each have values associated with them in order to categorize the color in such a way that the color may be reproduced. For example, with a cathode ray tube (CRT) device, computer monitor, and other such similar display devices, the colors of individual pixels are identified in terms of the red (R), green (G) and blue (B) components of the color to be displayed for the pixel. For devices that provide hard copy images, such as for example, printers, photocopiers, and the like, the colors that are output are identified by their cyan (C), magenta (M), yellow (Y) and black (K) components.

When an image displayed on a display device, such as a CRT or computer monitor, is to be converted into a hard copy of the image, the RGB values of the display must be converted into the CMYK values that are useable by the hard copy output device. This is typically done by converting the RGB into CMYK values using a look-up table. The look-up table includes values that approximate a transformation from RGB to a device-independent color space representation, such as L* a* b* which represents the colors perceived by the human eye, and then from device-independent color space representation into CMYK values.

Each hard copy output device has a limited gamut of colors that can be reproduced by the device. Because of these gamut limitations, not all of the RGB colors provided by the display device may be accurately represented on a hard copy. Typically, when the desired RGB colors lay outside the gamut of the particular hard copy output device, the desired RGB colors are mapped to colors that can be output by the hard copy device. Thus, there is a difference in the colors seen by the human eye and the colors that are output by the hard copy output device and hence, the desired colors of the image cannot be obtained using the hard copy output device.

Similarly, each hard copy output device may have its own characteristics that cause it to output a different color from colors of other hard copy output devices. For example, the output colors may be dependent on the fact that the hard copy output device uses a different type of color ink or toner, has a low ink or toner state, and the like. Additionally, over time, the output of the hard copy output device may drift, i.e. deviate from predetermined optimum standards, due to various factors. These factors include environmental conditions, such as temperature, relative humidity, and the like, use patterns, the type of media used, such as different paper types, transparencies, and the like, variations in media, variations from original models used in initializing the hard copy output device, general wear, and the like. Thus, even though the color specified by the RGB values may be within the gamut of the hard copy output device, the desired color may still not be achieved due to a current status of the hard copy output device.

SUMMARY OF THE INVENTION

This invention provides apparatus and methods that obtain consistent results across a plurality of different hard copy output devices.

This invention separately provides apparatus and methods that provide consistent output image quality across a plurality of different hard copy devices by adjusting input color values based on detected color values.

One exemplary embodiment of a system according to this invention comprises an image data source, a printable image data adjusting system, a hard copy output device and an image sensor. The image data source supplies image data to the printable image data adjusting system. The image data may be in a device-dependent color space or a device-independent color space. If the image data is in a device-dependent color space, the printable image data adjusting system converts the image data into device-independent image data and stores the device-independent image data in a memory as target image data. If the image data is already device-independent image data, the device-independent image data is simply stored in the memory of the printable image data adjusting system as the target image data.

The printable image data adjusting system then uses the target image data to generate printable image data that is in a color space useable by the hard copy output device, such as CMYK image data. The printable image data adjusting system then supplies this printable image data to the hard copy output device, which generates a hard copy of the image. The image is then placed within the optical field of the image sensor. The image sensor detects color values of device-independent image data from the image generated by the hard copy output device. The detected color values of device-independent image data is then provided to the printable image data adjusting system, which compares the detected color values of device-independent image data to the color values of the target image data to generate color adjustment factors.

The color adjustment factors are then applied to generate adjusted printable image data. This color adjusted printable image data is used by the hard copy output device to generate a new hard copy image. This new hard copy image should result in, for example, detected device-independent image data that more closely represents the target image data. Alternatively, the printable image data may be adjusted to obtain any desired effect. The process may be iteratively performed until a particular tolerance is obtained or a maximum number of iterations is achieved. The process may also be performed in real time.

BRIEF DESCRIPTION OF THE DRAWINGS

Exemplary embodiments of the apparatus and methods of this invention will be described with reference to the following figures, wherein like numerals designate like elements, and wherein.

DETAILED DESCRIPTION OF PREFERRED EMBODIMENTS

Figure 1:
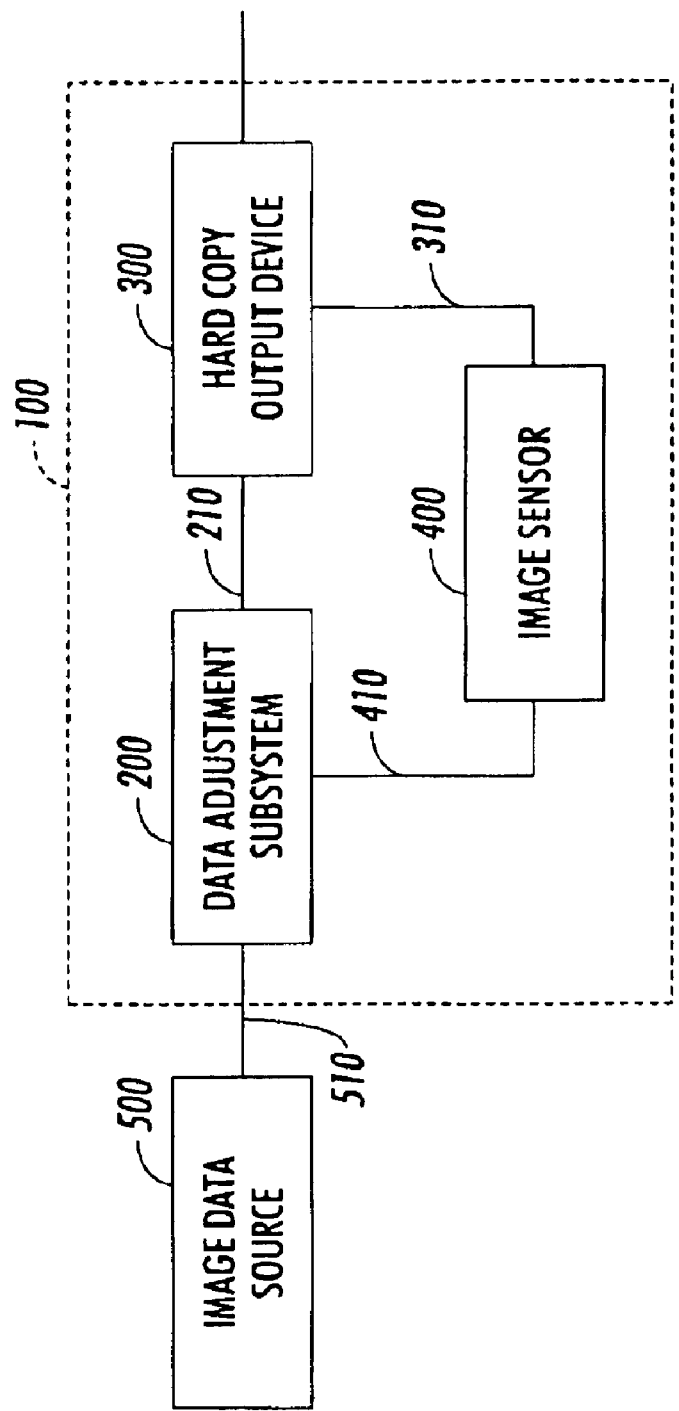
FIG. 1 is a functional block diagram of one exemplary embodiment of a print system according to this invention.

FIG. 1 shows a functional block diagram of one exemplary embodiment of a system according to this invention. As shown in FIG. 1, the printable image data adjusting system 100 is connected to an image data source 500, and includes a data adjusting subsystem 200, a hard copy output device 300 and an image sensor 400. These devices are coupled together via data communication links 210, 310, 410 and 510, respectively. These links may be any type of link that permits the transmission of data. For example, the links may be direct serial connections, a local area network (LAN), wide area network (WAN), an intranet, the Internet, circuit wirings, and the like.

The image data source 500 is any type of device that provides image data. For example, the image data source 500 may be a personal computer, a microprocessor, a scanner, a disk drive, a tape drive, a hard disk, zip drive, CD-ROM drive, a DVD drive, a network server, a print server, a copying device or any other known or later developed device or system that is able to provide the image data. The image data source 500 may include a plurality of components including displays, user interfaces, memory, disk drives, and the like. For simplicity of the following disclosure, it will be assumed that the image data source is a personal computer although, as indicated above, the image data source is not limited to a personal computer.

The hard copy output device 300 is any type of device that is capable of outputting a hard copy of an image. For example, the hard copy output device 300 may be a laser printer, a bubble jet printer, an ink jet printer, a copying machine, or any other known or later developed device or system that is able to generate an image on a recording medium using the image data or data generated from the image data. The hard copy output device 300 generates the hard copy of the image based on printable image data generated by the data adjusting subsystem 200.

The image sensor 400 is any type of device that is capable of detecting image data from a hard copy image and supplying the image data as detected device-independent image data to the data adjusting subsystem 200. For example, the image sensor may be an optical sensor, a spectrophotometer, a color sensor, or any other known or later developed device or system that is able to measure the color values of the image data from the hard copy image output by the hard copy output device 300.

While FIG. 1 shows the printable image data adjusting system 100 as a separate device from the image data source 100, the printable image data adjusting system 100 may be an integrated device, such as a digital copier, a computer with a built-in printer, or any other integrated device that is capable of producing a hard copy image output. With such a configuration, for example, the image data source 500, the data adjusting subsystem 200, the hard copy output device 300 and the sensor 400 may be contained within a single device.

Alternatively, the printable image data adjusting system 100 may be a separate device containing the data adjusting subsystem 200 and the sensor 400 attachable upstream of a stand-alone hard copy output device 300. For example, the data adjusting subsystem 200 and sensor 400 may be a device which interfaces with both the image data source 500 and one or more hard copy output devices 300. For example, the printable image data adjusting system 100 may be incorporated into a network print server that manages printer data for a plurality of the same or different printer devices.

Furthermore, the printable image data adjusting system 100 may be implemented as software on the data adjusting subsystem 200 or the image data source 500. The image sensor 400 may be incorporated into the printer 300 or may exist as a stand alone device that communicates the detected data back to the image data source 500. Other configurations of the elements shown in FIG. 1 may be used without departing from the spirit and scope of this invention.

The term "image," as used in this disclosure, refers to any image containing any or all of: one or more continuous tone and/or line art graphics and/or any compilation of text, line art and images that is capable of being displayed on a display device or as a hard copy. For example, an image may be a combination of graphics and text that is stored in the image data source 500 as a series of pixel values denoting the color, the intensity, and/or any other known or later developed image property of the particular pixels that make up the image.

The image data source 500 provides image data that, when used to display the image or convert the image into a hard copy, provides an approximate representation of the image. The image data source 500 provides the image data to the printable image data adjusting system 100.

The image data input to the data adjusting subsystem 200 may be in either a device-dependent color space or a device-independent color space. For example, if the image data source 500 is a personal computer, the image data used for representing the image is typically in the RGB color space, since this is the color space used by a display of the image data source 500. These RGB values may be directly forwarded to the data adjusting subsystem 200 or may undergo conversion into a device-independent color space, such as $L^* a^* b^*$, prior to being input to the data adjusting subsystem 200.

Methods for converting device-dependent color space values into device-independent color space values are readily known to those of ordinary skill in the art. For example, one method of converting from device-dependent to device-independent color space is to use a printer model. Another method is to simply use a three dimensional space to $L^* a^* b^*$ look-up table or four dimensional CMYK to $L^* a^* b^*$ look-up table. Any known or later developed method may be used without departing from the spirit and scope of this invention.

If the conversion of the device-dependent color space values into device-independent color space values is not performed by the image data source 500 when inputting the image data to the printable image data adjusting system 100, then the printable image data adjusting system 100 may perform the conversion between the device-dependent and the device-independent color spaces. In either case, the printable image data adjusting system 100 performs adjustment operations using device-independent image data.

The printable image data adjusting system 100 receives the device-independent image data of the image to be reproduced or converts the received device-dependent image data into device-independent image data. The device-independent image data represents the pixel colors, intensities, and the like, of the image that are perceived by the human eye irrespective of the device generating the image. For example, the device-independent image data may be image data in the L* a* b* color space. The device-independent image data is stored in a memory of the printable image data adjusting system 100 as target image data.

The data adjusting subsystem 200 transforms the device-independent image data into printable image data based on the color space used by the hard copy output device 300. For example, if the hard copy output device 300 is a printer, the color space used by the printer will often be the CMYK color space. Thus, in such a case, the data adjusting subsystem 200 will convert the device-independent image data into CMYK-color-space printable image data. In any case, the image data is then input to the hard copy output device 300 in order to output a hard copy image.

Because of various factors, such as environmental conditions, use patterns, the type of media used, variations in media, variations from original models used in initializing the hard copy output device, general wear, and the like, the colors capable of being output by the hard copy output device 300 may not be the same as the desired colors represented by the device-independent image data, L* a* b*.

In the printable image data adjusting system 100 according to this invention, when a hard copy of the image is output by the hard copy output device 300, the hard copy is placed within the field of detection of the image sensor 400. The image sensor 400 generates L* a* b* image data from the hard copy image and inputs this L* a* b* image data into the data adjusting subsystem 200 as detected device-independent color image data.

The data adjusting subsystem 200 compares the detected device-independent image data values with the target image data stored in the memory. Based on the comparison, adjustment factors are determined that adjust the printable image data such that the resulting image output by the hard copy output device 300 results in detected device-independent image data values that more closely correspond with the target image data. The adjustment factors may be, for example, L* a* b* adjustment values. When these L* a* b* adjustment factors are applied to the target L* a* b* image data, and the resulting adjusted L* a* b* image data is converted into the CMYK color space, the resulting adjusted CMYK image data produces an image having detected device-independent image data values that more closely correspond to the target L* a* b* image data. Alternatively, the adjustment factors may be values that directly adjust the printable image data values, for example, the CMYK or L* a* b* printable image data values, to result in a hard copy image having detected device-independent image data values that more closely correspond to the target L* a* b* image data.

This process may be repeated a number of times until an amount of error between the detected device-independent image data and the target image data falls within an acceptable tolerance. The process may also be restricted to a preset number of iterations. The tolerance and/or number of iterations may be supplied in a look-up table, stored in memory, or supplied to the printable image data adjusting system 100 from the image data source 500. If the image data source 500 supplies the tolerances and/or number of iterations, these may be user-selectable via a user interface incorporated in the image data source 500.

Once the detected L* a* b* image data is within the given tolerances, and/or the maximum number of iterations have been performed, the data adjusting subsystem 200 provides the hard copy output device 300 with the final set of printable image data usable to output the final image. In this way, the final image will more closely resemble the desired output image regardless of the particular hard copy output device that produces the final image. Thus, if the same image is to be printed by a plurality of different hard copy output devices having different attributes or different printer drifts, regardless of the different attributes and different printer drifts, substantially the same final image will be produced by each hard copy output device. Accordingly, consistency of output among a plurality of different hard copy output devices is obtained.

The above description assumes that the entire image is output during each iteration of the color adjustment performed by the printable image data adjusting system 100. However, rather than the entire image being produced during each iteration, test patches may be generated based on one or more selected portions of the image. These selected portions of the image may be selected, for example, by a user through a user interface in the image data source 500 or may be automatically selected or determined by the data adjusting subsystem 200.

Figure 2:
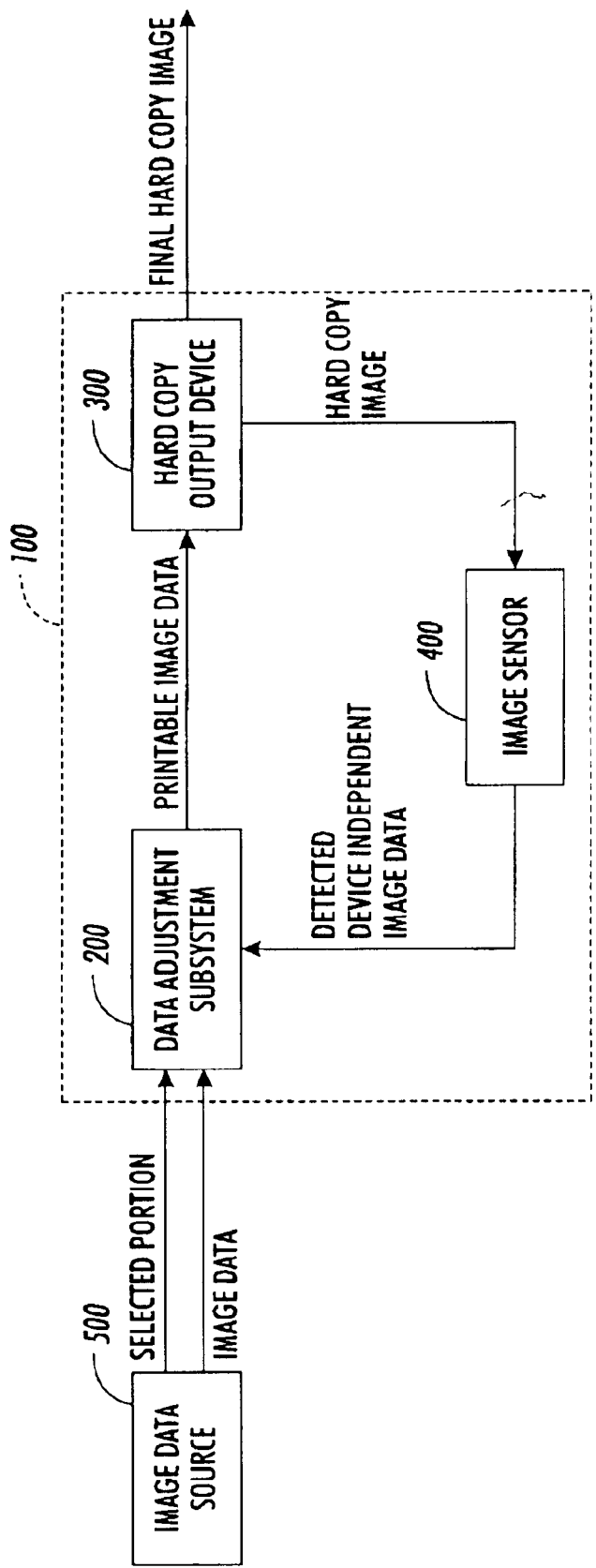
FIG. 2 is a block diagram showing the flow of data between the elements of the print system of FIG. 1.

FIG. 2 shows the flow of data between the elements of the printable image data adjusting system 100 shown in FIG. 1. As shown in FIG. 2, selected image portions, if any, and the image data are input to the printable image data adjusting system 100 from the image data source 500. The data adjusting subsystem 200 converts the image data, including the selected image portions, if any, into printable image data. The printable image data is input to the hard copy output device 300. The printable image data adjusting system 100 may then instruct the hard copy output device 300 to produce a test pattern from the printable image data or the selected image portion, if supplied. Alternatively, the printable image data adjusting system 100 may decompose the image data into particular color values and instruct the hard copy output device 300 to produce a plurality of test patterns representing selected ones of the particular color values.

The hard copy output device 300 outputs a hard copy image from either the entire image, the selected portions, or the test patterns. The hard copy image is then placed within the optical field of the image sensor 400. The hard copy image may be placed within the optical field of the image sensor 400 either manually or automatically. For example, the hard copy image may be transported by a user and placed, for example in a hard copy holder which holds the hard copy image for detection by the image sensor 400. Alternatively, the hard copy image may be placed in the optical field of the image sensor 400 by way of an automatic transport path that brings the hard copy image within the optical field of the image sensor 400. For example, the hard copy image may be transported via a belt system, gripping devices, or other known or later developed devices that are capable of transporting hard copy images from a first position to a position within the optical field of the image sensor 400.

The image sensor 400 detects device-independent image data from the hard copy image and sends the device-independent image data to the data adjusting subsystem 200. The data adjusting subsystem 200 then uses this data to adjust the printable image data to more closely represent the target image data. Once the detected device-independent color space image data values are within a given tolerance or a maximum number of iterations have been performed, the hard copy output device 300 outputs a final hard copy image. This iterative process may be performed in real time.

Figure 3:
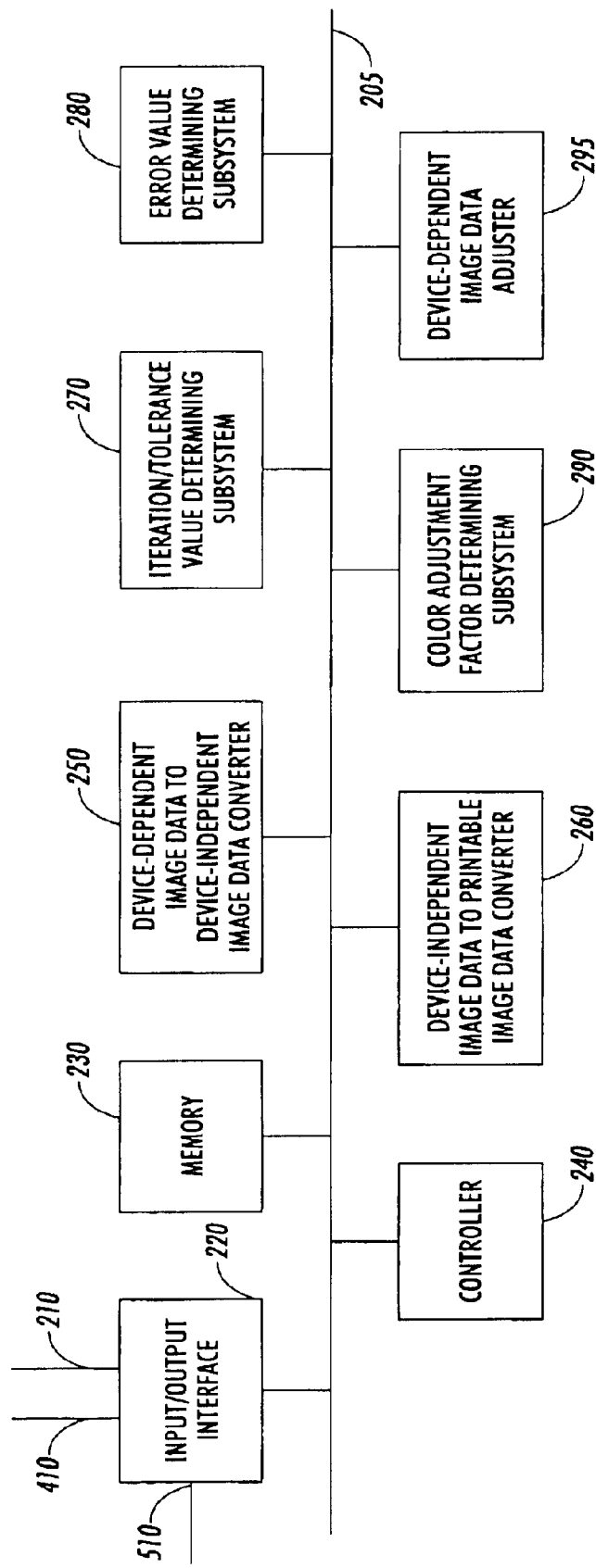
FIG. 3 is a functional block diagram of the printable image data adjusting system of FIG. 1.

FIG. 3 is a functional block diagram showing in greater detail one exemplary embodiment of the data adjusting subsystem 200. As shown in FIG. 3, the data adjusting subsystem 200 includes an input/output interface 220, a memory 230, a controller 240, a device-dependent image data to device-independent image data converter 250, a device-independent to printable image data converter 260, an iteration/tolerance value determining subsystem 270, an error value determining subsystem 280, a color adjustment factor determining subsystem 290, and a device-dependent image data adjuster 295. The elements of the data adjusting subsystem 200 communicate with one another over a data and/or control bus 205 under the control of the controller 240. The input/output interface 220 is connected to the link 510 from the image data source 500, the link 210 to the hard copy output device 300 and the link 410 from the image sensor 400. While the functional block diagram of FIG. 3 shows the components of the data adjusting subsystem 200 being connected via the bus 205, other configurations and devices may be used to facilitate communication between the components without departing from the spirit and scope of this invention.

The data adjusting subsystem 200 receives the image data from the image data source 100 via the input/output interface 220 and stores the image data in memory 230. If the values received are not in a device-independent color space, the controller 240 instructs the device-dependent image data to device-independent image data converter 250 to convert the device-dependent color space image data into device-independent color space image data. The device-independent color image data generated by the device-independent image data converter 250 are then stored in the memory 230 as the target image data.

The device-independent image data to printable image data converter 260, under control of the controller 240, converts the target image data stored in the memory 230 into printable image data that is in a color space useable by the hard copy output device 300. For example, the device-independent image data to printable image data converter 260 may convert the target image data into printable CMYK image data.

The iteration/tolerance value determining subsystem 270 determines if a maximum number of iterations and/or the tolerances have been designated for the color adjustment. If the number of iterations and/or tolerances have not been designated, default values are used during the subsequent color adjustment process.

The controller 240 then outputs the printable image data to the hard copy output device 300 via the input/output interface 220. Once the hard copy output device 300 outputs a hard copy of the image based on the printable image data, the hard copy is placed within the optical field of the image sensor 400. The image sensor 400 detects device-independent image data, for example, L* a* b* color space image data, from the hard copy image. The detected device-independent image data is then input to the data adjusting subsystem 200 via the input/output interface 220.

The controller 240 stores the detected device-independent image data in the memory 230. The error value determining subsystem 280, under control of the controller 240, compares the detected device-independent image data with the target image data stored in the memory 230 and determine any error values. The color adjustment factor determining subsystem 290, under control of the controller 240, determines one or more color adjustment factors based on the determined error values.

The device-dependent image data adjuster 295, under control of the controller 240, applies the adjustment factors to either the target image data or the printable image data, depending on the particular embodiment, and another iteration of the color adjustment process is performed. This operation is repeated until the selected number of iterations is performed or until the error determined by the error value determining subsystem 280 lies within an acceptable tolerance, as determined by the iteration/tolerance value determining subsystem 270.

Figure 4:
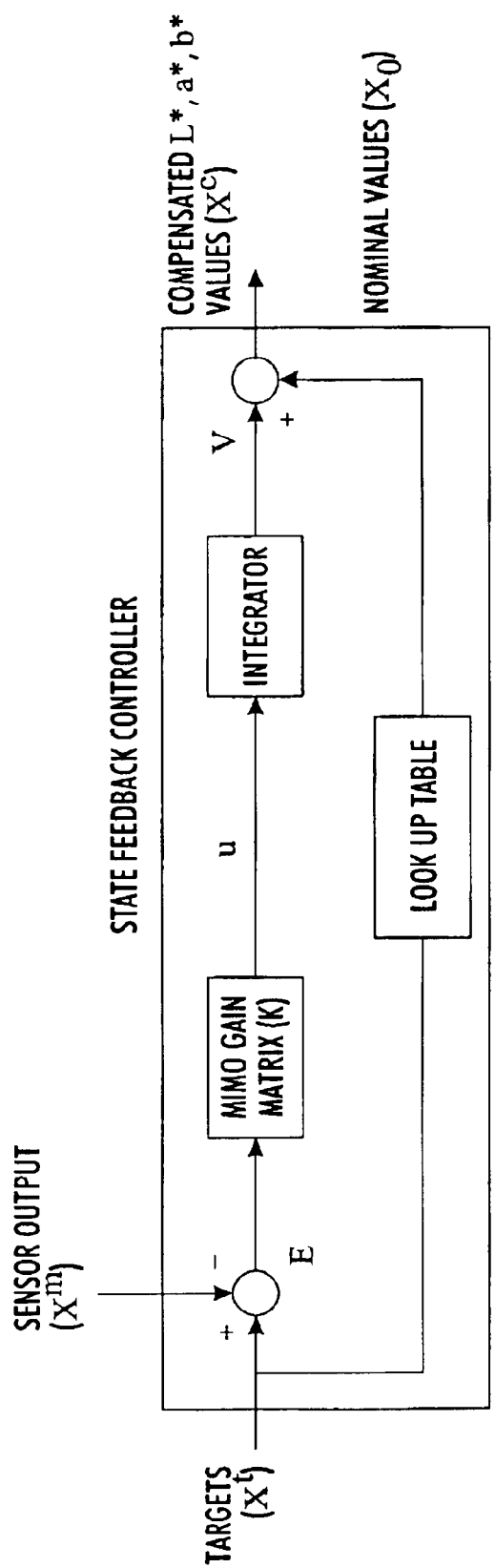
FIG. 4 is an example of a discrete linear state feedback controller.

FIG. 4 is a block diagram of one exemplary embodiment of a state feedback controller which models the operation of one exemplary embodiment of the color adjustment factor determining subsystem 290 of FIG. 3 according to this invention. Referring to FIG. 4, the feedback control equations are:

$$E(k)=[L{*}_1^t-L{*}_1^m a{*}_1^t-a{*}_1^m b{*}_1^t-b_1^m \ldots L{*}_N^t-L{*}_N^m a{*}_N^t- a{*}_N^m b{*}_N^t-b_N^m], \qquad (1)$$

$$u(k)=KE(k), \text{ and} \qquad (2)$$

$$V(k)=V(k-1)+u(k) \qquad (3)$$

where:

k is the iteration or number of hard copies;

E(k) is the error between the target or original image pixel values and the detected pixel values;

$L{*}_1, a{*}_1, b{*}_1, \ldots L{*}_N, a{*}_N, b{*}_N$, etc. are the L*, a*, b* values of test patches # 1, 2, ..., N;

K is a gain matrix of dimension N×N; and

V(k) is the delta value for color adjustment of the L* a* and b* values.

The matrix K is determined from a first set of input-output data provided to the printable image data adjusting system 100. The matrix K may be stored in the memory 230. The lookup table shown in FIG. 4 is also obtained from input-output data provided to the printable image data adjusting system 100.

As shown in FIG. 4, the target L* a* b* pixel values, or the original image pixel values, $x^t$ are supplied to the state feedback controller. The L* a* b* values $x^m$, which are derived from the detected device-independent image data obtained from the image sensor 400, are subtracted from the target values $x^t$. The resulting error values E are provided to the gain matrix (K), which outputs the values u to the integrator. The integrator in turn outputs the change in L* a* b* as V. The change value V is then added to the nominal color value obtained from the look-up table based on the target values. The result is the compensated L* a* b* values to be used in the next iteration of the color adjustment process.

While the above outlined linear state feedback controller may be used as a model of the color adjustment factor determining subsystem 290, other types of models may also be used without departing from the spirit and scope of this invention. For example, the color adjustment factor determining subsystem 290 may use a nonlinear type model, a neural network type model, an expert system type model, or any other known or later developed model or method. These models may be implemented in the color adjustment factor determining subsystem 290 using hardware, software, or a combination of hardware and software.

Figure 5:
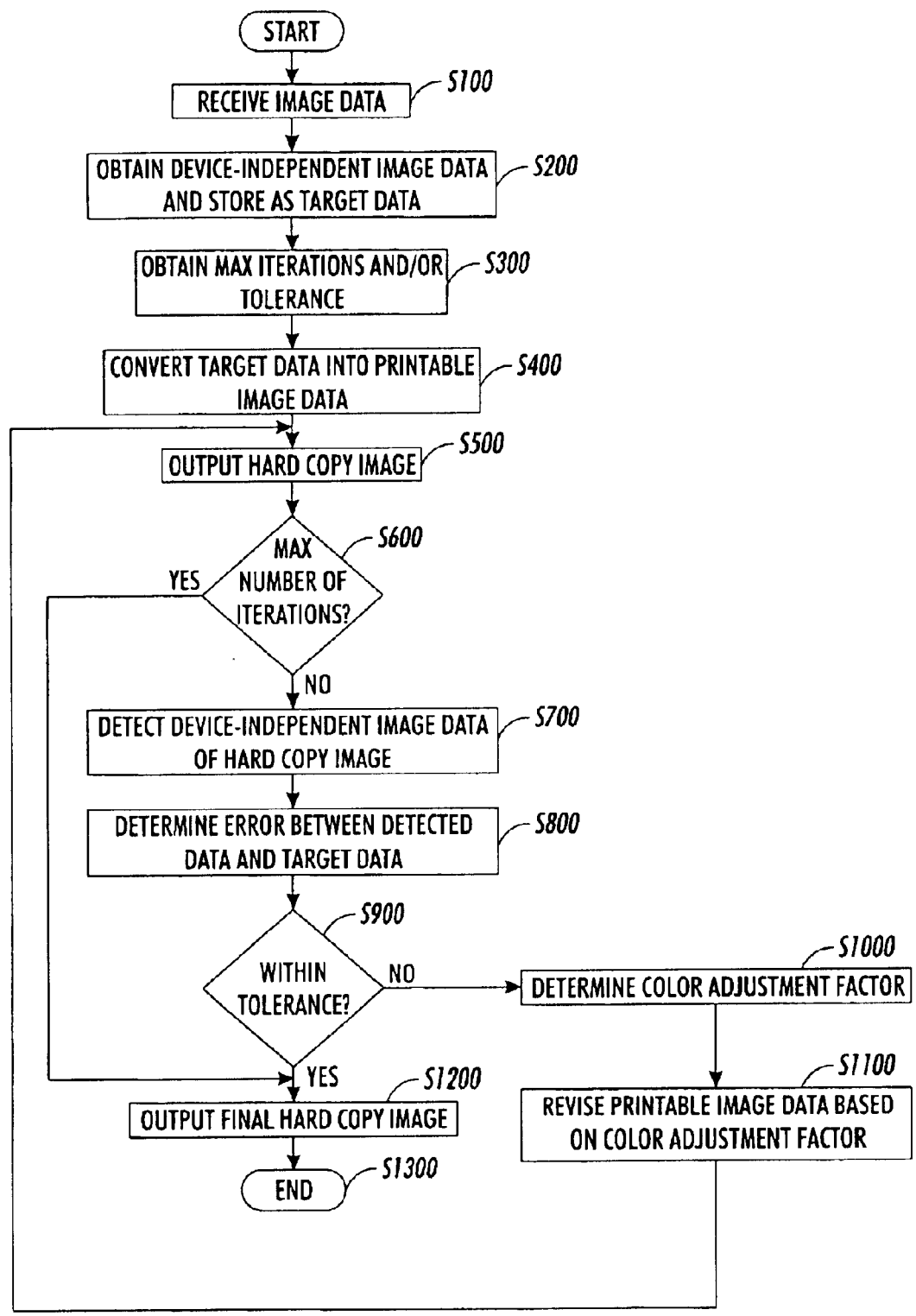
FIG. 5 is a flowchart outlining one exemplary embodiment of a method for adjusting the image data according to this invention.

FIG. 5 is a flowchart outlining an exemplary embodiment of a method for adjusting device-independent/dependent image data based on the device-independent image data measured from the output of the hard copy device 300. In step S100, the image data is received and is stored. Then, in step S200, device-independent image data is obtained by either converting the received image data from device-dependent image data into device-independent image data and storing the device-independent image data as target image data or, if the received image data is already device-independent, simply storing the device-independent image data as target image data. Control continues to step S300.

In step S300, the maximum number of iterations and/or the desired tolerances of the final image data are obtained. Next, in step S400, the device-independent image data is converted into printable image data that falls within a color space and gamut used for outputting a hard copy of the image. Then, in step S500, a hard copy of the image is output using the printable image data determined in step S400. Control then continues to step S600.

In step S600, a determination is made whether the number of iterations is equal to a maximum number of iterations. If the number of iterations is equal to the maximum number of iterations, control jumps to step S1200. Otherwise, control continues to step S700.

In step S700, device-independent image data from the hard copy image output in step S500 is detected. Then, in step S800, an error between the detected device-independent image data and the target image data is determined. Next, in step S900, a determination is made whether the error is within the established tolerance. If the error is within the established tolerance, control goes to step S1200. Otherwise, control continues to step S1000.

In step S1000, one or more color adjustment factors are determined based on the error determined in step S800. Next, in step S1100, the color adjustment factors are applied to adjust the device-dependent image data and the number of iterations is incremented. For example, the adjustment factors may be applied in a manner similar to that described in incorporated U.S. Pat. No. 09/083,203. Control then returns to step S500.

In step S1200, a hard copy of the final image is output. Then, in step S1300, the method ends.

Figure 6:
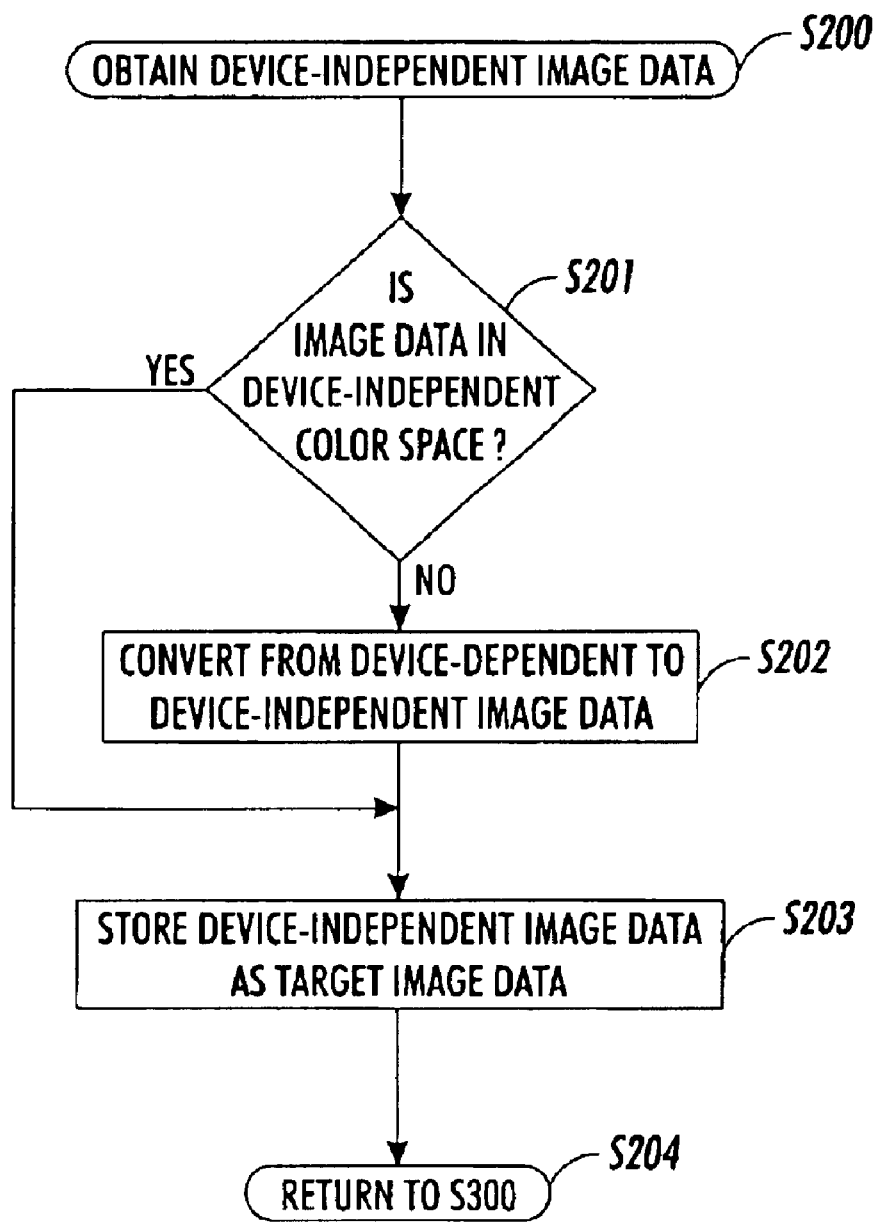
FIG. 6 is a flowchart outlining in greater detail one exemplary embodiment of the method for obtaining device-independent image data of FIG. 5.

FIG. 6 is a flowchart outlining in greater detail one exemplary embodiment of the method for obtaining device-independent image data of step S200 of FIG. 5. Beginning with step S200, control continues to step S201 where a determination is made whether the received image data is in a device-independent color space or a device-dependent color space. If the image data is in a device-independent color space, control jumps to step S203. Otherwise, control continues to step S202.

In step S202, the device-dependent image data is converted into device-independent image data. Then, in step S203, the device-independent image data is stored as target image data. Next, in step S204, control returns to step S300.

Figure 7:
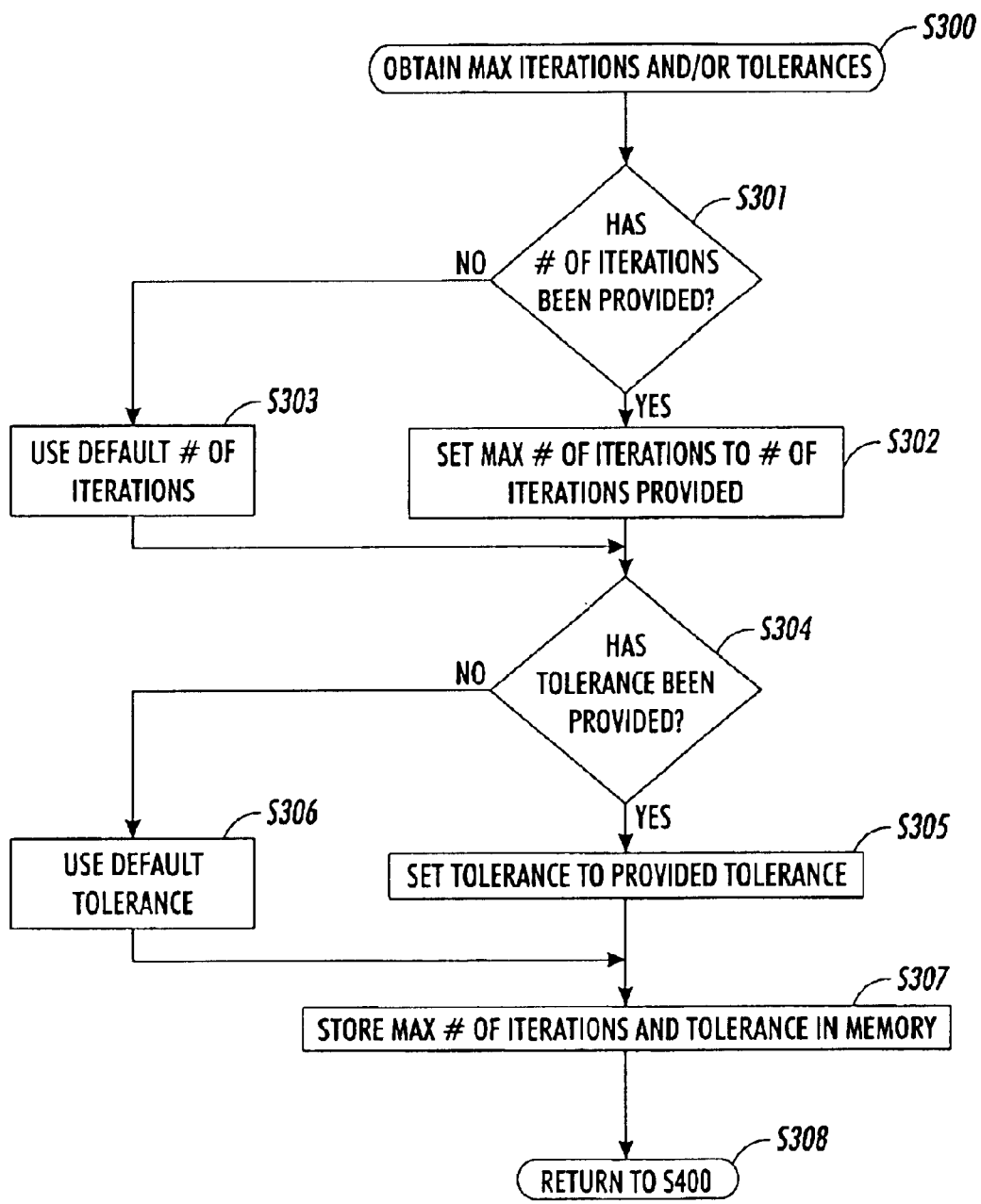
FIG. 7 is a flowchart outlining in greater detail one exemplary embodiment of the method for obtaining the maximum number of iterations to be performed or the tolerance to be used in the method of FIG. 5.
Figure 8:
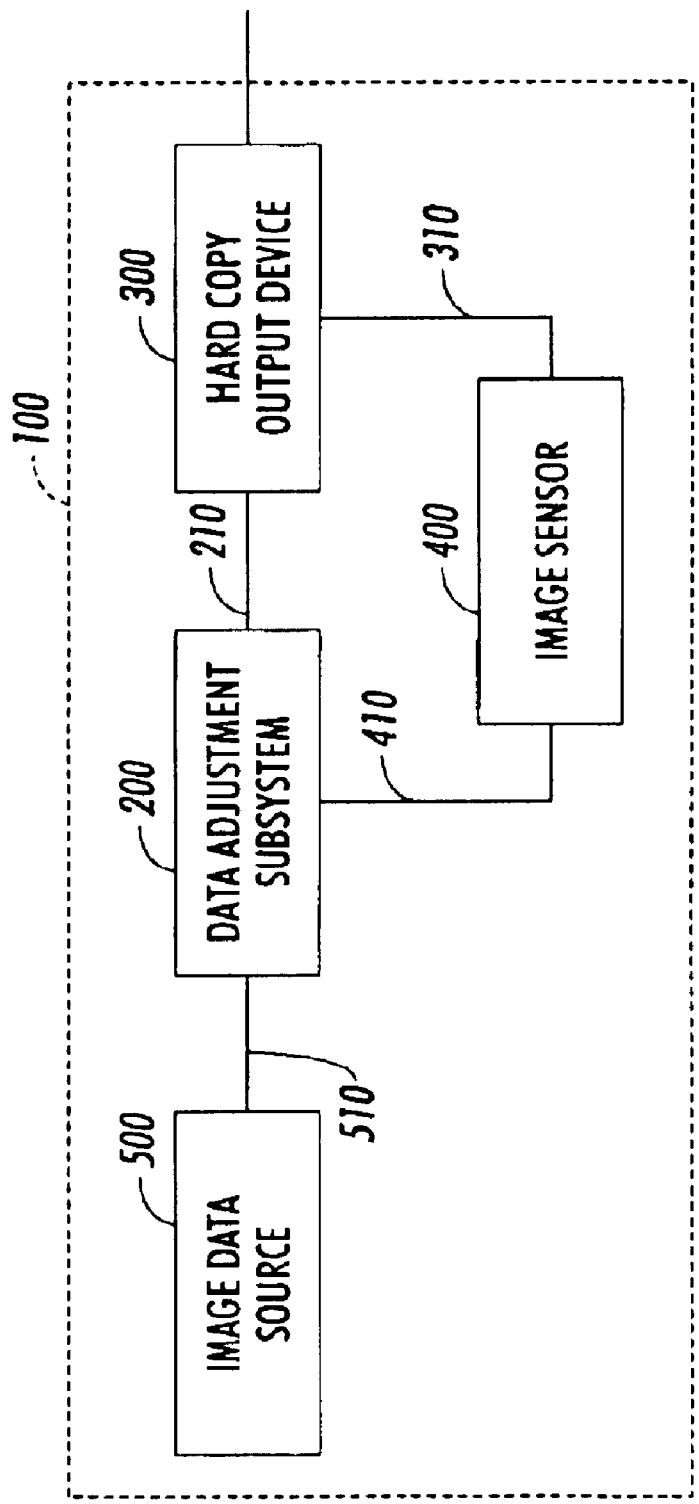
FIG. 8 is a functional block diagram of an exemplary embodiment of a single device print system according to this invention.

FIG. 7 is a flowchart outlining in greater detail one exemplary embodiment of the method for obtaining the maximum number of iterations to be performed or the tolerance to be used of step S300 of FIG. 5. Beginning with step S300, control continues to step S301 where a determination is made whether a number of iterations has been provided. If the number of iterations has been provided, control continues to step S302. Otherwise, control jumps to step S303

In step S302, the number of iterations provided is set as the maximum number of iterations. Control then jumps to step S304. In contrast, in step S303, the maximum number of iterations is set to a default number of iterations. Control then continues to step S304.

In step S304, a determination is made whether acceptable tolerances have been provided. If acceptable tolerances have been provided, control continues to step S305. Otherwise, control jumps to step S306.

In step S305, the tolerances are set to the provided acceptable tolerances. Control then jumps to step S307. In contrast, in step S306, the tolerances are set to default levels. Control then continues to step S307.

In step S307, the maximum number of iterations and tolerances are stored in memory. Then, in step S308 control returns to step S400.

As can be seen from the above-outlined description, since color adjustment is based on device-independent color space pixel values, consistent color output among a plurality of hard copy output devices can be achieved. Thus, the user is assured that the image that is provided in hard copy form will be the same regardless of the hard copy output device that is used to produce the hard copy of the image.

As an exemplary implementation of this invention, an exemplary distributed printing systems has a plurality of hard copy output devices 300. In this exemplary distributed printing system, the printable image data adjusting system 100 may be a separate device from the image data source 500 and the hard copy output devices 300, it may be incorporated into the image data source 500, or a separate printable image data adjusting system 100 may be used for each distinct hard copy output device 300. For purposes of the following description, in this exemplary distributed printing system, each hard copy output device 300 is combined with a distinct sensor 400 and a distinct data adjusting subsystem 200 to form a separate printable image data adjusting system 100.

Each hard copy output device 300 of the distributed printing system is configured in the manner described above. However, each of the hard copy output devices 300 has its own characteristics and drift. Thus, if the different hard copy devices 300 were configured as in the prior art, these differing characteristics and drifts would cause each hard copy output device 300 to output an image having different color values from the other hard copy output devices 300.

A central print server, forming the image data source 500, may send the same image to each hard copy output device 300. Because each printable image data adjusting system 100 incorporating the respective one of the hard copy output devices 300, performs color adjustment of the color values based on device-independent color space values, each set of printable image data has different color adjustments applied to it. Due to this individual color adjustment and the consistency of the device-independent color space values among the hard copy output devices 300, the resulting hard copy image is consistent among each of the hard copy output devices 300.

While this invention is described with the image data source 500 and the data adjusting subsystem 200 as separate devices, the image data source 500 and data adjusting subsystem 200 may be incorporated into a single device. For example, a computer having a built-in printing device may be used which incorporates both the image data source 500 and the data adjusting subsystem 200 in a single unit.

The data adjusting subsystem 200 can be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowcharts shown in FIGS. 5–7 can be used to implement the data adjusting subsystem 200 of this invention. Thus, the various elements of the data adjusting subsystem 200 can be implemented as various software programs, subroutines or procedures executable on the general or special purpose computer, microprocessor or microcontroller.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method for producing an adjusted image output, comprising:
    determining target image data for an input image;
    determining first image data from the target image data;
    producing a first hard copy output image based on the first image data;
    detecting the first hard copy output image and generating second image data from the first hard copy output image;
    comparing the generated second image data and the target image data;
    determining at least one adjustment factor based on the comparison;
    adjusting at least one of the target image data and the first image data using the at least one adjustment factor to produce adjusted image data; and
    producing an adjusted image output using the adjusted image data.

2. The method of claim 1, wherein the at least one adjustment factor adjusts the target image data to produce adjusted target image data that, upon conversion into the first image data, generates an image having detected second image data that approximates the target image data.

3. The method of claim 1, wherein the at least one adjustment factor adjusts the first image data so that the adjusted image data generates an image having detected second image data that approximates the target image data.

4. The method of claim 1, wherein the target image data is supplied by an image data source.

5. The method of claim 1, further comprising repeating the detecting, comparing, determining adjusting and producing steps until the generated second image data falls within a predetermined tolerance or until a maximum number of iterations is achieved.

6. The method of claim 1, wherein the method is performed in real time.

7. A method for producing an adjusted image output, comprising:
    determining target image data for an output image;
    determining first image data from the target image data;
    producing a first image output based on the first image data;
    detecting second image data from the first image output;
    comparing the detected second image data and the target image data;
    determining at least one adjustment factor based on the comparison;
    adjusting at least one of the target image data and the first image data using the at least one adjustment factor to produce adjusted image data;
    producing an adjusted image output using the adjusted image data; and
    wherein the first image data is device-dependent image data and the second image data is device-independent image data.

8. The method of claim 7, wherein the device-independent image data is in the L* a* b* color space.

9. The method of claim 7, wherein the device-dependent image data is in one of a RGB color space and a CMYK color space.

10. A method for producing an adjusted image output, comprising:
    determining target image data for an output image;
    determining first image data from the target image data;
    producing a first image output based on the first image data;
    detecting second image data from the first image output;
    comparing the detected second image data and the target image data;
    determining at least one adjustment factor based on the comparison;
    adjusting at least one of the target image data and the first image data using the at least one adjustment factor to produce adjusted image data; and
    producing an adjusted image output using the adjusted image data;
    wherein the at least one adjustment factor is determined using at least one of a linear controller, a non-linear controller, a neural network and an expert system.

11. An image data adjusting apparatus, comprising:
    a memory that receives and stores device-independent target image data;
    a printable image data converter to convert device-independent target image data to printable image data;
    an error value determining device that determines errors between the target image data and image data based on a printed image generated using the converted device-independent target image data; and
    a color adjustment factor determining device that determines an adjustment factor based upon the determined errors for the data used to generate the printed image; and
    a printable image data adjuster that provides adjusted device-independent printable image data.

12. The apparatus of claim 11, wherein:
    the printable image data converter converts the target image data into printable image data;
    the printable image data is output to at least one hard copy output device; and
    the at least one hard copy output device outputs a first hard copy image based on the printable image data.

13. The apparatus of claim 12, further comprising a sensor interface that receives detected device-independent image data from a sensor, wherein the sensor detects the detected device-independent image data from the hard copy image output by the at least one hard copy output device based on the printable image data.

14. The apparatus of claim 11, wherein the error value determining device determines an error value between detected device-independent image data values and the target image data.

15. The apparatus of claim 11, wherein the color adjustment factor determining device determines at least one color adjustment factor based on an error value determined by the error value determining device.

16. The apparatus of claim 15, wherein the at least one color adjustment factor adjusts the target image data to produce adjusted target image data such that, upon the adjusted target image data being converted into the printable image data, the printable image data will result in a hard copy image having detected device-independent image data that more closely approximates a desired hard copy output image.

17. The apparatus of claim 15, wherein the at least one color adjustment factor adjusts the printable image data to produce adjusted printable image data such that, upon the adjusted printable image data being input to the hard copy output device, the hard copy output device generates a hard copy image having detected device-independent image data that more closely approximates a desired hard copy output image.

18. The apparatus of claim 11, wherein:
the printable image data adjuster outputs adjusted printable image data based on at least one color adjustment factor determined by the color adjustment factor determining device; and
the adjusted printable image data is input to at least one hard copy output device.

19. The apparatus of claim 11, further comprising:
an interface capable of receiving image data from an image data source; and
a device-independent image data converter.

20. The apparatus of claim 19, wherein:
the device-independent image data converter converts the image data into device-independent image data; and
the device-independent image data is stored in the memory as the target image data.

21. The apparatus of claim 19, wherein the device-independent image data and detected device-independent image data are in the L* a* b* color space.

22. The apparatus of claim 19, wherein the device-dependent image data is in one of the RGB color space and the CMYK color space.

23. The apparatus of claim 11, wherein the image data adjusting apparatus repeatedly performs color adjustment until detected device-independent image data falls within a predetermined tolerance or until a maximum number of iterations is achieved.

24. The apparatus of claim 11, wherein the memory, the printable image data converter, the error value determining device, the color adjustment factor determining device and the printable image data adjuster comprise a single device.

25. The image data adjusting apparatus of claim 11, further comprising:
a hardcopy image generator that produces a hardcopy based on the device-independent target image data;
wherein the source of the device-independent image data is a sensor that generates the sensed device-independent image data from the hardcopy.

26. The image data adjusting apparatus of claim 11, further comprising:
a tolerance or iteration value device to perform color adjustment until a specified color tolerance or number of color adjustment iterations have been made.

27. A hard copy outputting system, comprising:
at least one image data source;
at least one printable image data adjusting subsystem coupled to the at least one image data source;
at least one hard copy output device, coupled to the at least one printable image data adjusting system, for outputting a hard copy image; and
at least one sensor that detects device-independent image data from the hard copy image;
wherein the printable image data adjusting subsystem adjusts image data from the at least one image data source to produce printable image data that is output to the at least one hard copy output device to produce the hard copy image based on the printable image data and wherein the printable image data adjusting subsystem receives the device-independent image data and compares the device-independent image data to the image data from the image data source to determine at least one adjustment factor.

28. The system of claim 27, wherein:
the at least one printable image data adjusting subsystem applies the at least one adjustment factor to either the image data from the image data source or the printable image data to produce adjusted image data; and
the adjusted image data is output to the at least one hard copy device to produce an adjusted hard copy image.

29. The system of claim 27, wherein the at least one image data adjusting subsystem repeatedly performs color adjustment until detected device-independent image data falls within a predetermined tolerance or until a maximum number of iterations is achieved.

30. The system of claim 27, wherein the at least one image data source, the at least one printable image data adjusting subsystem, the at least one hard copy output device and the at least one sensor are contained within a single device.

31. The system of claim 27, wherein the printable image data adjusting subsystem and the sensor are contained in a single device coupled to the at least one hard copy output device and the at least one image data source.

* * * * *